United States Patent
Oliveri

(10) Patent No.: US 12,019,730 B2
(45) Date of Patent: Jun. 25, 2024

(54) SYSTEMS AND METHODS FOR IDENTIFYING COMPUTING DEVICES

(71) Applicant: Red Hat, Inc., Raleigh, NC (US)

(72) Inventor: Richard Oliveri, Warren, NJ (US)

(73) Assignee: RED HAT, INC., Raleigh, NC (US)

( * ) Notice: Subject to any disclaimer, the term of this patent is extended or adjusted under 35 U.S.C. 154(b) by 343 days.

(21) Appl. No.: 17/487,263

(22) Filed: Sep. 28, 2021

(65) Prior Publication Data

US 2023/0104862 A1    Apr. 6, 2023

(51) Int. Cl.
*H04L 29/06* (2006.01)
*G06F 9/445* (2018.01)
*G06F 9/455* (2018.01)
*G06F 21/44* (2013.01)

(52) U.S. Cl.
CPC .......... *G06F 21/44* (2013.01); *G06F 9/44505* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 8,010,466 B2 * | 8/2011 | Patinkin | H04L 51/212 706/12 |
| 8,234,687 B2 * | 7/2012 | Baumhof | H04L 63/20 713/168 |
| 8,321,648 B2 | 11/2012 | Condict | |
| 8,387,106 B2 * | 2/2013 | Karaoguz | H04L 63/08 725/148 |
| 9,639,697 B2 | 5/2017 | Friedrichs et al. | |
| 10,013,539 B1 * | 7/2018 | Hazan | G06F 21/44 |
| 10,331,658 B2 * | 6/2019 | Pennefather | G06F 16/2365 |
| 10,830,863 B1 | 11/2020 | Shemesh et al. | |

(Continued)

FOREIGN PATENT DOCUMENTS

CN   102811213 A   12/2012

OTHER PUBLICATIONS

Martínez, et al., "An Improved Bytewise Approximate Matching Algorithm Suitable for Files of Dissimilar Sizes", Institute of Physical and Information Technologies (ITEFI), Spanish National Research Council (CSIC), Serrano, Madrid, Spain; Feb. 21, 2020; Accepted: Mar. 30, 2020; Published: Apr. 2, 2020, Mathematics 2020, 8, 503; doi:10.3390/math8040503; pp. 1-37, 37 Pages.

(Continued)

*Primary Examiner* — Maung T Lwin
(74) *Attorney, Agent, or Firm* — Kilpatrick Townsend & Stockton LLP

(57) ABSTRACT

The present disclosure provides new and innovative systems and methods for identifying computing devices. In an example, a computer-implemented method includes obtaining device attribute data for a computing device, generating a device fingerprint including a piecewise hash generated based on the device attribute data, determining a closest matching fingerprint, calculating attribute differences based on the device fingerprint and the closest matching fingerprint, verifying the closest matching fingerprint identifies the computing device based on the attribute differences, updating the closest matching fingerprint in a fingerprint database, and transmitting a notification generated based on the verifying.

20 Claims, 5 Drawing Sheets

(56) References Cited

U.S. PATENT DOCUMENTS

| | | | |
|---|---|---|---|
| 2009/0113545 A1* | 4/2009 | Pic | G06F 16/435 |
| | | | 726/22 |
| 2014/0066015 A1* | 3/2014 | Aissi | H04W 4/60 |
| | | | 455/411 |
| 2015/0237038 A1* | 8/2015 | Grajek | G06F 21/64 |
| | | | 726/8 |
| 2019/0104140 A1* | 4/2019 | Gordeychik | H04L 63/1433 |
| 2020/0021582 A1 | 1/2020 | Brown et al. | |
| 2020/0099684 A1* | 3/2020 | Nagaraja | G06F 21/45 |

OTHER PUBLICATIONS

Edir Garcia Lazo, "Combing Through the Fuzz: Using Fuzzy Hashing and Deep Learning to Counter Malware Detection Evasion Techniques", Microsoft 365 Defender Research Team, pp. 1-13, Jul. 27, 2021, 13 Pages.

Breitinger, et al. "Performance Issues About Context-Triggered Piecewise Hashing", Jan. 2012, DOI: 10.1007/978-3-642-35515-8_12, Center for Advanced Security Research Darmstadt (CASED) and Department of Computer Science, Hochschule Darmstadt, Mornewegstr. 32, D { 64293 Darmstadt, Germany, pp. 1-16, 17 Pages.

Idan Amit, et al. "Machine Learning in Cyber-Security—Problems, Challenges and Data Sets" [Submitted on Dec. 19, 2018 (v1), last revised Apr. 22, 2019 (this version, v3)], Palo Alto Networks; Shodan, 8 Pages.

Extended European Search Report dated Apr. 13, 2022 (Apr. 13, 2022); European Application No. 21209242.3-1218; pp. 1-13; 13 Pages.

Kornblum et al: "Identifying almost identical files using context triggered piecewise hashing", Digital Investigation, Elsevier, Amsterdam, NL, vol. 3, Sep. 1, 2006 (Sep. 1, 2006), pp. 91-97, XP005564885, ISSN: 17 42-2876.

Anonymous: "Context Triggered Piecewise Hashing—Forensics Wiki", Dec. 20, 2007 (Dec. 20, 2007), XP055908519, Retrieved from the Internet: URL:https://forensicswiki.xyz/wiki/index.php?title=Context_Triggered_Piecewise_Hashing&oldid=2239 [retrieved on Apr. 4, 2022].

* cited by examiner

SYSTEMS AND METHODS FOR IDENTIFYING COMPUTING DEVICES

BACKGROUND

A computer may communicate with a variety of other computers connected to a computer network. Each computer on the network can be identified based on an identifier assigned to the network interface controller (NIC) installed in the computer. A media access control address is an identifier assigned to the NIC for use as a network address in communications via the computer network.

SUMMARY

The present disclosure provides new and innovative systems and methods for identifying computing devices. In an example, a computer-implemented method includes obtaining device attribute data for a computing device, generating a device fingerprint including a piecewise hash generated based on the device attribute data, determining a closest matching fingerprint, calculating attribute differences based on the device fingerprint and the closest matching fingerprint, verifying the closest matching fingerprint identifies the computing device based on the attribute differences, updating the closest matching fingerprint in a fingerprint database, and transmitting a notification generated based on the verifying.

In an example, an apparatus includes a processor and a memory in communication with the processor and storing instructions that, when executed by the processor, cause the apparatus to obtain device attribute data for a computing device, generate a device fingerprint based on the device attribute data, determine a closest matching fingerprint by identifying a plurality of candidate fingerprints based on the device fingerprint, calculating edit distances between the device fingerprint and each of the plurality of candidate fingerprints, and selecting the candidate fingerprint with the smallest edit distance as the closest matching fingerprint, calculate attribute differences based on the device fingerprint and the closest matching fingerprint, verify the closest matching fingerprint identifies the computing device based on the attribute differences, and update the closest matching fingerprint in a fingerprint database.

In an example, a non-transitory computer readable medium storing instructions that, when executed by one or more processors, cause the one or more processors to perform steps including obtaining device attribute data for a computing device, the device attribute data including at least one software attribute and a plurality of hardware attributes, generating a first device fingerprint based on the at least one software attribute, generating a second device fingerprint based on the plurality of hardware attributes, determining a closest matching fingerprint based in the first device fingerprint and the second device fingerprint, calculating attribute differences based on the first device fingerprint, the second device fingerprint, and the closest matching fingerprint, verifying the closest matching fingerprint identifies the computing device based on the attribute differences, updating the closest matching fingerprint in a fingerprint database, and transmitting a notification generated based on the verifying, the notification indicating at least one change in software installed on the computing device, the at least one change determined based on the attribute differences and the first device fingerprint.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, where.

DETAILED DESCRIPTION

Figure 1:
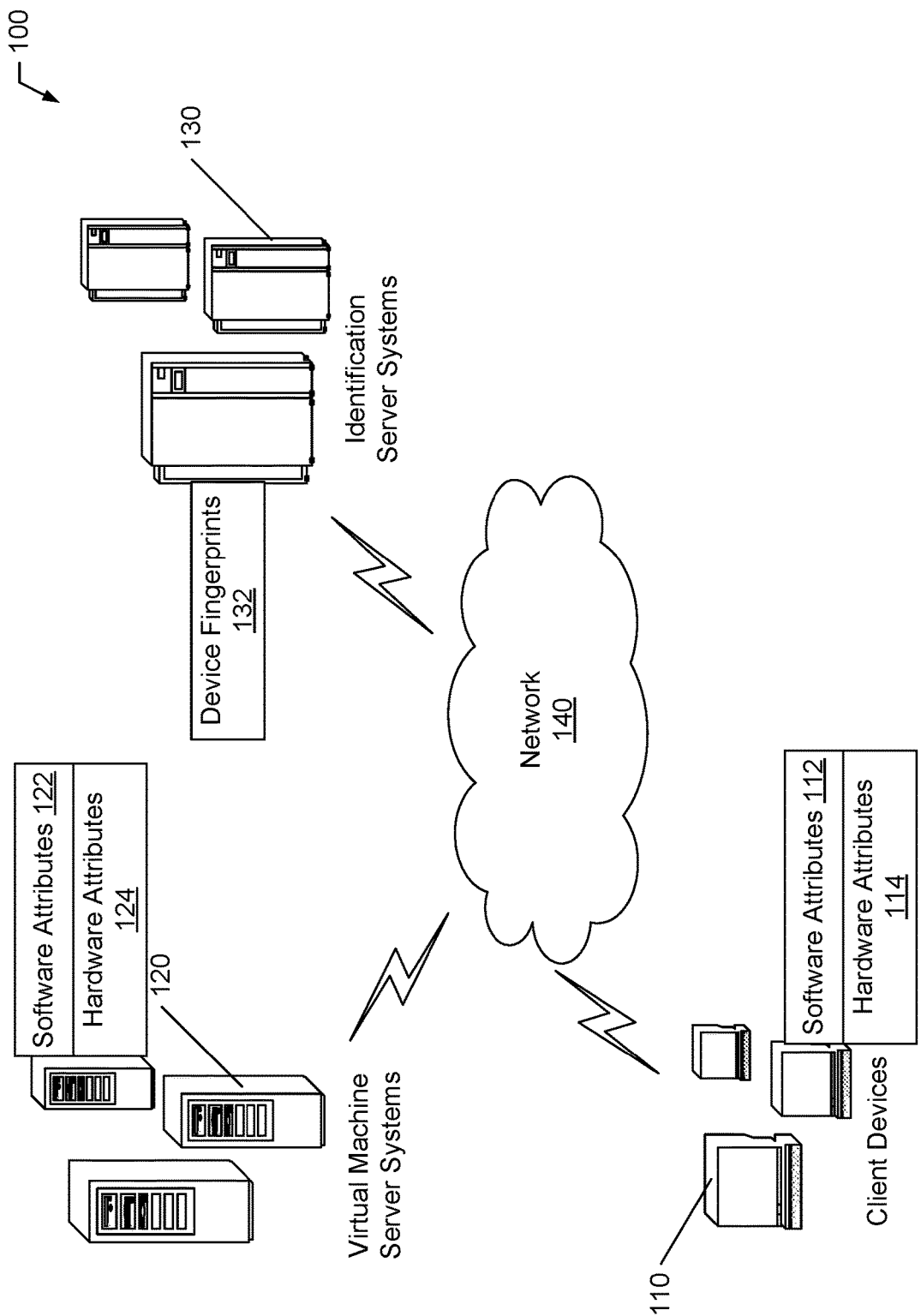
FIG. 1 illustrates a block diagram of a computing system according to an example aspect of the present disclosure.

Turning now to the drawings, techniques are disclosed for new and innovative systems and methods for identifying and validating computing devices. Computing devices typically have a variety of hardware devices and software applications installed. Many of these software applications can be licensed to a particular computing device or set of computing devices. Typical systems can use identifiers associated with the hardware devices to generate a hashed signature identifying the computing device. These hashed signatures can be stored using a database. When a software application is to be installed on a computing device, the database can be queried and the hashed signature can be used to determine if the computing device is associated with the software application. However, if the hardware of the computing device changes, the hashed signature for the computing device changes, the identity of the computing device may not be confirmed, and the software application may not be able to be installed on the computing device. Further, the hardware identifiers are not immutable and may not be globally unique. For example, attributes, such as a BIOS universally unique identifier (UUID) or a media access control (MAC) address can change over the lifetime of a computing device and have been known to be duplicated within a large enough scope. Additionally, existing techniques utilize complex search queries searching for multiple attributes with varying priorities are to query the database. This can lead to performance and scalability issues and may not work when one or more of the attributes change. Moreover, for virtual computing devices, the virtual hardware for the virtual computing device may not have a unique identifier such that a unique signature may not be generated for the virtual computing device.

Systems and methods in accordance with aspects of the disclosure can generate unique fingerprints for computing devices, including virtual computing devices, and use those fingerprints to identify and validate the computing devices even as the underlying hardware and/or software of the computing device changes. In a variety of aspects, a device fingerprint for a computing device can include one or more context triggered piecewise (CTP) hashes generated based on the hardware and/or software applications present on the computing device. For example, a hardware CTP hash can be generated based on the hardware present in the computing device and a software CTP hash can be generated based on the software applications installed on the computing device. A CTP hash can match data having homologies, where the data has sequences of identical bytes in the same order, although the bytes in between these sequences may be different in both content and length. For example, as a hardware CTP hash for a computing device can be generated based on a plurality of hardware components, as individual pieces of hardware in the computing device change, only the portion of the hardware CTP hash associated with a particular piece of hardware changes, resulting in localized changes in the hardware CTP hash and the majority of the hardware CTP hash will remain unchanged. Because the majority of the hardware CTP hash remains the same, the fingerprint of the computing device can account for changes in the hardware installed in the computing device over time. Further, the fingerprint can be used to track the changes in the hardware of the computing device.

In order to identify and/or authenticate a computing device, a device fingerprint can be generated for the computing device and that fingerprint can be compared against a database of known fingerprints for a variety of known computing devices. This comparison can be a fuzzy comparison based on an edit distance between the fingerprint and the known fingerprints. This fuzzy comparison can be used to identify one or more potentially matching candidate fingerprints for further analysis. When a matching fingerprint is identified, the identity of the computing device can be confirmed. In the event that some of the hardware and/or software attributes of the computing device have changed, the stored device fingerprint for the computing device can be updated to reflect these changes. Once identified, the computing device can be validated or authenticated to perform a variety of actions such as, but not limited to, installing software applications, accessing secured data, and the like.

The systems and methods disclosed herein provide a variety of improvements to existing identification techniques and improve the functioning of a computer itself. Existing techniques for identifying a computing device based on a hash of particular attributes of the computing device typically fail in the event of any changes to the identifying attributes of the computing device. The systems and methods disclosed herein allow the identification of a host even after one or more of its attributes change. Further, the fingerprint for the computing device can be updated to reflect the changes in the attributes of the computing device. In this way, the fingerprints provide a resilient mechanism for device identification when any of the identifying attributes change that is typically not possible with existing techniques. These techniques provide an improvement to the functioning of a computing device itself to automatically identify and authorize computing devices, improving the ability to accurately identify computing devices in the event changes are made to the computing devices and improving the security of computing systems utilizing these techniques.

A variety of systems and methods in accordance with aspects of the disclosure are described in more detail below.

Computing Systems

FIG. 1 illustrates a block diagram of a computing system according to an example aspect of the present disclosure. The computing system 100 can include client devices 110, virtual machine server systems 120, and/or identification server systems 130 in communication via network 140. In many aspects, the virtual machine server systems 120 and/or identification server systems 130 are implemented using a single server. In a variety of aspects, the virtual machine server systems 120 and/or identification server systems 130 are implemented using a plurality of servers. In several aspects, client devices 110 are implemented utilizing the virtual machine server systems 120 and/or identification server systems 130. In a variety of aspects, the virtual machine server systems 120 and/or identification server systems 130 are implemented using the client device 110.

Client devices 110 can have a variety of installed hardware and/or software applications and have one or more device attributes (including software attributes 112 and hardware attributes 114) defined based on the hardware and/or software applications. Client devices 110 can generate device fingerprints, provide device attribute data and/or device fingerprints, and/or request verification and/or authentication as described in more detail herein. Virtual machine server systems 120 can provide one or more virtual computing devices. The virtual computing devices can have a variety of virtual hardware and/or software applications and have one or more device attributes (including software attributes 122 and hardware attributes 124) defined based on the virtual hardware and/or software applications. The virtual computing devices can generate device fingerprints, provide device attribute data and/or device fingerprints, and/or request verification and/or authentication as described in more detail herein. Identification server systems 130 can store a device fingerprint database 132, obtain device attribute data and/or device fingerprints for a computing device, generate device fingerprints, determine if the computing device matches or partially matches a known computing device, and/or provide validation and/or authentication of the identity of the computing device as described in more detail herein.

Any of the computing devices shown in FIG. 1 (e.g. client devices 110, virtual machine server systems 120, and identification server systems 130) can include a single computing device, multiple computing devices, a cluster of computing devices, and the like. A computing device can include one or more physical processors communicatively coupled to memory devices, input/output devices, and the like. As used herein, a processor may also be referred to as a central processing unit (CPU). Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and a plurality of registers. In many aspects, a processor may be a single core processor that is typically capable of executing one instruction at a time (or process a single pipeline of instructions) and/or a multi-core processor that may simultaneously execute multiple instructions. In a variety of aspects, a processor may be implemented as a single integrated circuit, two or more integrated circuits, and/or may be a component of a multi-chip module in which individual microprocessor dies are included in a single integrated circuit package and hence share a single socket. As discussed herein, a memory refers to a volatile or non-volatile memory device, such as RAM, ROM, EEPROM, or any other device capable of storing data. Input/output devices can include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In several aspects, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure.

The network 140 can include a LAN (local area network), a WAN (wide area network), telephone network (e.g. Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, and the like. A variety of authorization and authentication techniques, such as username/password, Open Authorization (OAuth), Kerberos, SecureID, digital certificates, and more, may be used to secure the communications. It will be appreciated that the network connections shown in the example computing system 100 are illustrative, and any means of establishing one or more communications links between the computing devices may be used.

Identifying and Validating Computing Devices

Computing devices can be identified based on a device fingerprint generated based on a variety of hardware and software attributes of the computing devices. The device fingerprint can include one or more CTP hashes, such as a hardware CTP hash generated based on the hardware attributes and a software CTP hash generated based on the software applications. This fingerprint can be compared to a database of known device fingerprints to identify potential matches. In several aspects, the comparison of fingerprints is done using a fuzzy comparison determined based on an edit distance calculated between the device fingerprint and a known device fingerprint. If a matching fingerprint is found, the identity of the computing device can be verified. Additionally, the device fingerprint can be updated in the fingerprint database. In this way, the changes in the computing devices can be tracked to accurately identify the computing devices over time.

Figure 2:
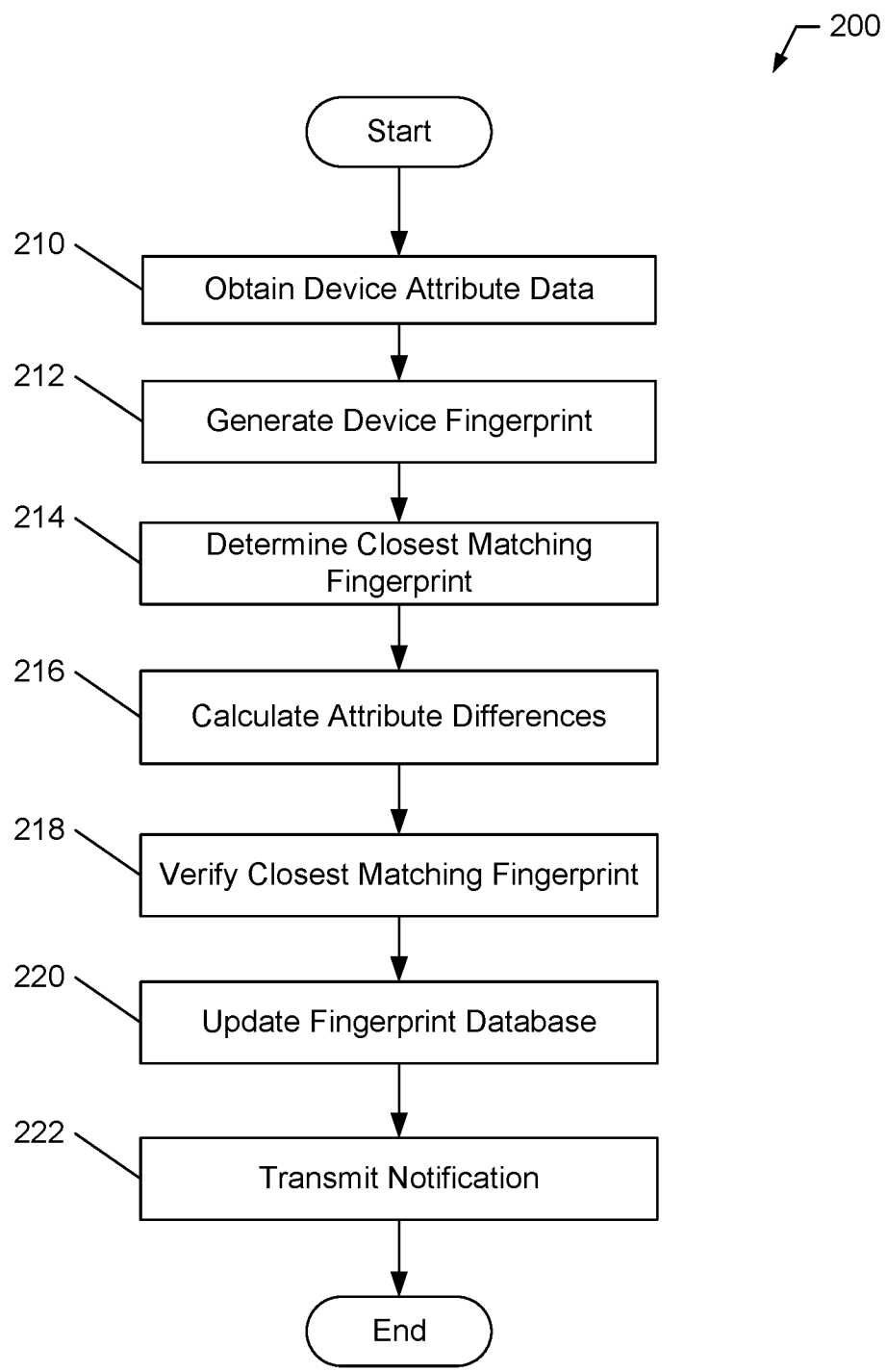
FIG. 2 illustrates a flowchart of a process for identifying a computing device according to an example aspect of the present disclosure.

FIG. 2 illustrates a flowchart of a process for identifying a computing device according to an example aspect of the present disclosure. Although the process 200 is described with reference to the flowchart illustrated in FIG. 2, it will be appreciated that many other methods of performing the acts associated with the process 200 may be used. For example, the order of some of the blocks may be changed, certain blocks may be combined with other blocks, one or more blocks may be repeated, and some of the blocks described are optional. The process 200 may be performed by processing logic that may include hardware (circuitry, dedicated logic, etc.), software, or a combination of both.

Device attribute data can be obtained (block 210). The device attribute data can identify software attributes, hardware attributes, and/or virtual device attributes for a computing device or a virtual computing device. Software attributes can include, but are not limited to, an operating system version, versions of particular software applications installed on the computing device, an internet protocol (IP) address, a fully qualified domain name, and the like. In several aspects, some or all of these software attributes, such as a fully qualified domain name, can be defined by a third-party server system and/or obtained from the third-party server system. Hardware attributes can include, but are not limited to, a BIOS universally unique identifier (UUID), media access control (MAC) addresses for one or more devices installed in the computing device, and the like. The installed devices can include, but are not limited to, network interface controllers (NICs), video cards, security modules (e.g. trusted platform modules), and the like. For virtual computing devices, virtual device attributes can be determined based on a provider type and a provider identifier. The provider type and provider identifier can identify the type and/or specific instance of a virtual computing device and host system providing the virtual computing device. However, it should be noted that any combination of attributes can be provided for a (virtual) computing device.

A device fingerprint can be generated (block 212). The device fingerprint can include one or more CTP hashes generated based on the device attribute data. The CTP hashes can be generated based on the software attributes, the hardware attributes, the virtual device attributes, and/or any combination of attributes as appropriate. The CTP hashes can include one or more hashes generated based on particular attributes identified in the device attribute data. For example, a software CTP hash can include hashes generated based on the IP address, the operating system version, the software applications installed on the computing device, and the fully qualified domain name. A hardware CTP hash can include hashes generated based on the BIOS UUID and the MAC addresses for each hardware device present in the computing device. A virtual device CTP hash can include hashes generated based on a provider type and a provider identifier. In a number of aspects, one or more attributes can be weighted in the determination of the device fingerprint. In a variety of aspects, a CTP hash includes a rolling hash generated based on the attributes, where the triggering of the rolling has causes a hash of the attribute to be stored in the CTP hash. The attribute hashes can be generated using any of a variety of hashing techniques, such as but not limited to MD5. In several aspects, an attribute can be weighted by duplicating the hash for the attribute in the CTP hash. In a variety of aspects, the weight of each attribute can be determined based on its relative uniqueness and mutability. For example, a BIOS UUID can be assigned a greater weight than a NIC MAC address as the BIOS UUID is typically more likely to be unique and less likely to change than the NIC MAC address.

A closest matching fingerprint can be determined (block 214). A closest matching fingerprint can be determined by a fuzzy comparison of the device fingerprint to a database of one or more known device fingerprints. In several aspects, comparing the device fingerprint to a known device fingerprint includes calculating an edit distance between one or more of the CTP hashes in the device fingerprint to one or more corresponding CTP hashes in the known device fingerprint. The edit distance can indicate a similarity between two CTP hashes and/or a number of characters differing between the two CTP hashes. In a number of aspects, the edit distance indicates portions of the CTP hashes that match or do not match. In many aspects, the edit distance returns a value between 0 and 100, where a value of 0 indicates that there are no matches between the two CTP hashes, a value of 100 indicates that the two CTP hashes are identical, and a value between 0 and 100 indicates a partial match. However, it should be noted that any representation of the similarity of two CTP hashes can be used as appropriate. The closest matching fingerprint can be determined as the known device fingerprint with the highest edit distance value with the device fingerprint. In a variety of aspects, the edit distance must exceed a threshold value (e.g. 25, 50, 75, or any other value) in order to be a candidate for the closest matching fingerprint. For example, if the edit distance between the device fingerprint and each of the known device fingerprints is below the threshold value, it can be determined that there is no matching fingerprint in the device fingerprint database.

Attribute differences can be calculated (block 216). The attribute differences can be calculated based on the differences between the device fingerprint and the closest matching fingerprint. In a variety of aspects, the attribute differences are determined based on differences between the software CTP hash in the device fingerprint and the closest matching fingerprint, the hardware CTP hash in the device fingerprint and the closest matching fingerprint, and/or the virtual device CTP hash in the device fingerprint and the closest matching fingerprint. In many aspects, the edit distance between two CTP hashes can be used to identify regions in the CTP hashes that are not identical. These regions can correspond to hashes generated based on particular attributes of the computing device. For example, if a computing device has a change in its installed NIC, the hash corresponding to the MAC address of the NIC in the hardware CTP hash will change. In this way, the fuzzy matching of the device fingerprint and the closest matching fingerprint can indicate which attributes (software, hardware, and/or virtual) differ.

A closest matching fingerprint can be verified (block 218). The closest matching fingerprint can identify a computing device. The closest matching fingerprint can be verified to confirm that the computing device identified by the closest matching fingerprint is the same computing device identified by the device fingerprint. In many aspects, the closest matching fingerprint is verified based on a score calculated based on the number of matching attributes and/or the number of differing attributes determined in the attribute differences. The score can be compared to a threshold value (pre-determined and/or determined dynamically based on the number of device attributes) and, if the score exceeds the threshold value, it can be determined that the computing device indicated by the device fingerprint is the same computing device indicated by the closest matching fingerprint. In many aspects, the attributes can be weighted in calculating the score. The attributes can be weighted based on any of a variety of factors, such as uniqueness, likelihood of change, and/or any other factors as appropriate. For example, a match for an installed software application can be assigned a value of 1, while a match on BIOS UUID can be assigned a value of 3. However, any weighting of attributes in order to generate the score can be used as appropriate. In many aspects, the score can be generated based on the hardware attributes, the software attributes, the virtual device attributes, and/or any combination of attributes as appropriate.

A fingerprint database can be updated (block 220). The fingerprint database can be updated to include the device fingerprint. For example, if there is no closest matching fingerprint, the device fingerprint can be added to the fingerprint database. When it is determined that the closest matching fingerprint identifies the same computing device as the device fingerprint, the closest matching fingerprint can be updated and/or replaced with the device fingerprint in the fingerprint database. In many aspects, multiple versions of the device fingerprint for a computing device can be stored in the fingerprint database. In this way, the changes in the computing device can be tracked over time.

A notification can be transmitted (block 222). A notification can be generated indicating that the identity of the computing device has been confirmed. The notification can be transmitted to any of a variety of computing devices for further processing. For example, if a user is trying to install a software application on the computing device, the notification can be provided to a license server associated with the software application and the license server can use the identity of the computing device to determine if the computing device is authorized to install and/or execute the software application. In another example, the notification can indicate that the computing device is known and the notification can be used by an authorization server to provide access to the computing device to resources in a federated computing environment.

Figure 3:
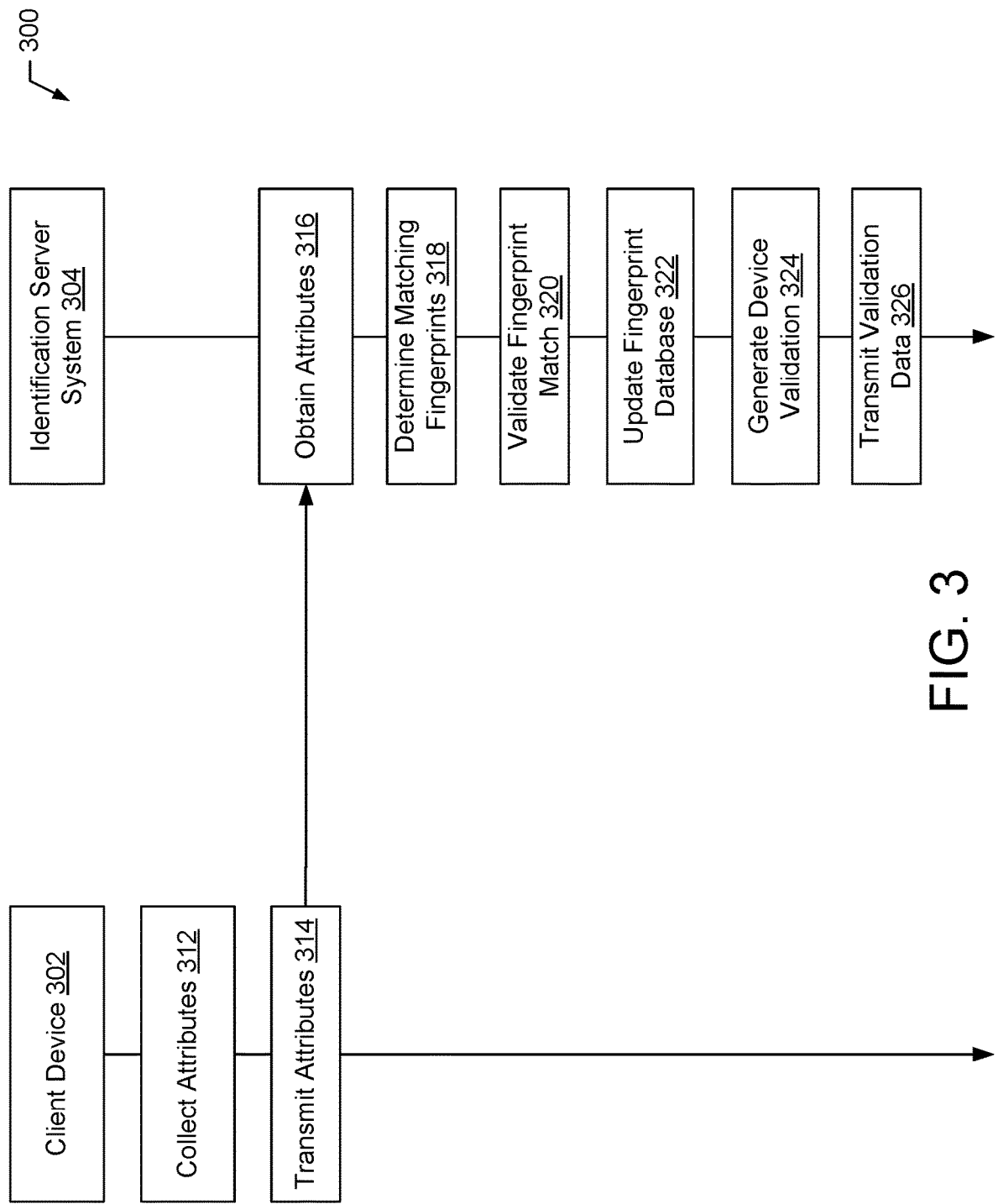
FIG. 3 illustrates a flow diagram of a process for validating a computing device according to an example aspect of the present disclosure.

FIG. 3 illustrates a flow diagram of a process for validating a computing device according to an example aspect of the present disclosure. Although the process 300 is described with reference to the flow diagram illustrated in FIG. 3, it will be appreciated that many other methods of performing the acts associated with the process 300 may be used. For example, the order of some of the blocks may be changed, certain blocks may be combined with other blocks, one or more blocks may be repeated, and some of the blocks described are optional.

At block 312, a client device 302 can collect attributes. The attributes can include hardware attributes, software attributes, and/or virtual device attributes of the client device 302. At block 314, the client device 302 can transmit the attributes to an identification server system 304. At block 316, the identification server system 304 can obtain the attributes from the client device 302.

At block 318, the identification server system 304 can determine matching fingerprints. Matching fingerprints can be determined by generating a device fingerprint having one or more CTP hashes generated based on the software attributes, the hardware attributes, and/or the virtual device attributes and performing a fuzzy comparison of the device fingerprint and one or more candidate fingerprints as described herein. The identification server system 304 can maintain a fingerprint database storing a variety of device fingerprints from which the candidate fingerprints are selected. At block 320, the identification server system 304 can validate the fingerprint matching. Validating the fingerprint matching can include verifying the computing device identified by the matching fingerprint corresponds to the client device 302 as described herein.

At block 322, the identification server system 304 can update the fingerprint database. The fingerprint database can be updated to include the device fingerprint and/or update the matching fingerprint based on the device fingerprint as described herein. At block 324, the identification server system 304 can generate a device validation. The device validation can indicate that the identity of the client device 302 has been confirmed. At block 326, the identification server system 304 can transmit the validation data. The validation data can be transmitted to any of a variety of computing devices, such as licensing server systems and/or authentication server systems, that provide one or more services to the client device 302. These computing devices can use the validated identification of the client device 302 to provide resources, such as software applications, security authorizations, and/or system access, to the client device 302.

Figure 4:
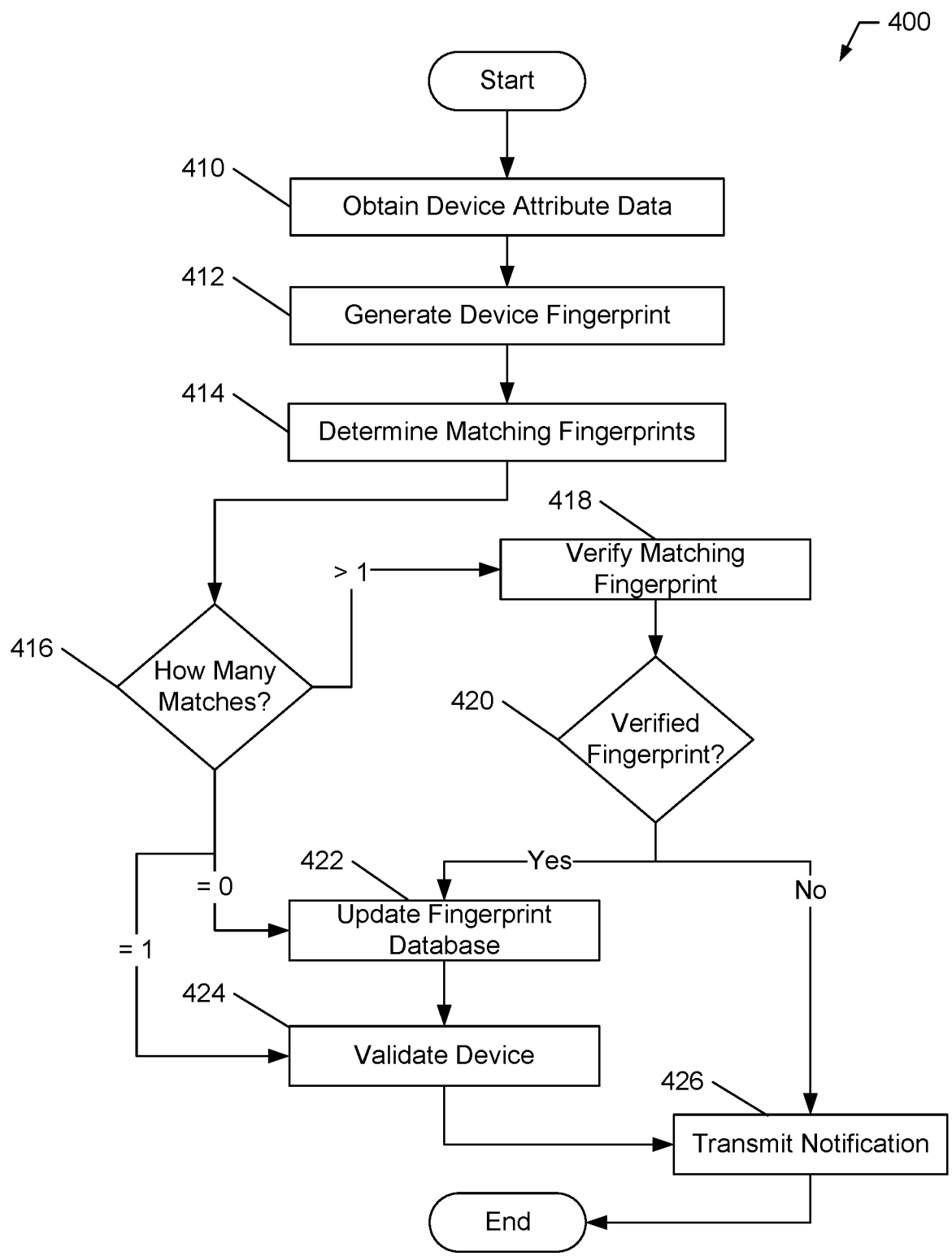
FIG. 4 illustrates a flowchart of a process for validating a computing device and updating a fingerprint database according to an example aspect of the present disclosure.

FIG. 4 illustrates a flowchart of a process for validating a computing device and updating a fingerprint database according to an example aspect of the present disclosure. Although the process 400 is described with reference to the flowchart illustrated in FIG. 4, it will be appreciated that many other methods of performing the acts associated with the process 400 may be used. For example, the order of some of the blocks may be changed, certain blocks may be combined with other blocks, one or more blocks may be repeated, and some of the blocks described are optional. The process 400 may be performed by processing logic that may include hardware (circuitry, dedicated logic, etc.), software, or a combination of both.

Device attribute data can be obtained (block 410). The device attribute data can include hardware attributes, software attributes, and/or virtual device attributes as described herein. A device fingerprint can be obtained (block 412). The device fingerprint can include one or more CTP hashes generated based on the hardware attributes, software attributes, and/or virtual device attributes as described herein. Matching fingerprints can be determined (block 414). Matching fingerprints can be determined based on a fuzzy comparison of the device fingerprint to one or more candidate fingerprints. In many aspects, the matching fingerprints are determined based on an edit distance between the CTP hashes in the device fingerprint and the CTP hashes in each of the candidate fingerprints as described herein.

The number of matching fingerprints can be determined (block 416). If there is more than one matching fingerprint, the process can move to block 418. If there are zero matching fingerprints, the process can move to block 422. If there is one matching fingerprint, the process can move to block 424.

Matching fingerprints can be verified (block 418). The closest matching fingerprint can be verified to confirm that the computing device identified by the closest matching fingerprint is the same computing device identified by the device fingerprint as described herein. When there is a verified fingerprint (block 420), the process can move to block 422. When there is not a verified fingerprint (block 420), the process can move to block 426.

A fingerprint database can be updated (block 422). The fingerprint database can be updated to include the device fingerprint. If there were no matching fingerprints, the device fingerprint can be added to the fingerprint database. If there were multiple matching fingerprints, the closet matching fingerprint that has been verified can be updated to include the device fingerprint. For example, the closest matching fingerprint can be replaced with the device fingerprint. In another example, the device fingerprint can be added to the fingerprint database as an updated version of the closest matching fingerprint.

A device can be validated (block 424). The device can be validated to confirm the identity of the computing device. The identity of the computing device can be confirmed when the device fingerprint calculated for the computing device matches a known device fingerprint (either a direct match and/or a fuzzy match that has been verified) stored in the fingerprint database. In this way, the device can be validated as a known computing device even when changes occur in the hardware and/or software of the computing device.

A notification can be transmitted (block 426). The notification can indicate the status of the validation, the identity of the computing device, and/or an indication if the identity of the computing device has been validated. When the computing device is not validated, the notification can indicate that the identity of the computing device could not be determined. When the computing device is validated, the notification can indicate the identity of the computing device and/or an indication of the successful validation as described herein. The notification can be transmitted to any of a variety of computing devices, such as licensing server systems and/or authorization systems, as described herein.

Figure 5:
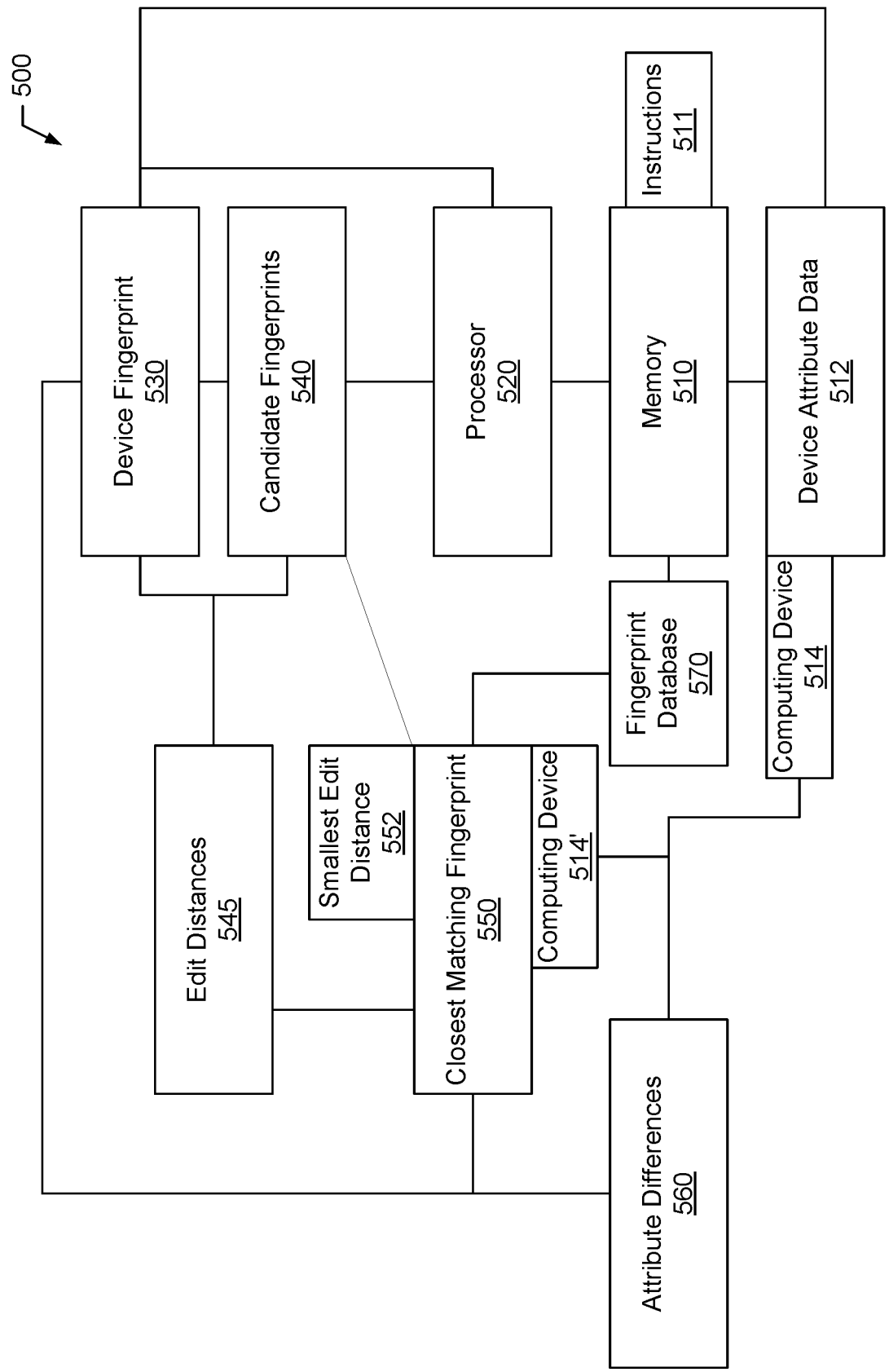
FIG. 5 illustrates a block diagram of an apparatus according to an example aspect of the present disclosure.

FIG. 5 illustrates a block diagram of an apparatus according to an example aspect of the present disclosure. The system 500 includes a memory 510 and a processor 520 in communication with the memory 510. The memory 510 can store instructions 511 that, when executed by the processor 520, cause the system 500 to perform a variety of processes as described herein. The instructions 511 can be embodied in computer-usable or readable data and include computer-executable instructions, such as in one or more program modules, executed by one or more computing devices as described herein. Program modules can include routines, programs, objects, components, data structures, and the like that perform particular tasks or implement particular abstract data types when executed by a processor. The modules may be written in a programming language that is subsequently compiled or interpreted for execution. Particular data structures may be used to more effectively implement one or more aspects discussed herein, and such data structures are contemplated within the scope of computer executable instructions and computer-usable data described herein.

The processor 520 can obtain device attribute data 512 identifying a computing device 514. The processor 520 can generate a device fingerprint 530 based on the device attribute data 512. The device fingerprint 530 can be compared to a plurality of candidate fingerprints 540 to determine a closest matching fingerprint 550. In a variety of aspects, the closest matching fingerprint 550 is determined by identifying a plurality of candidate fingerprints 540 based on the device fingerprint 530, calculating edit distances 545 between the device fingerprint 530 and each of the plurality of candidate fingerprints 540, and selecting the candidate fingerprint 540 with the smallest edit distance 552 as the closest matching fingerprint 550. The closest matching fingerprint 550 identifies a computing device 514'. The processor 520 can calculate attribute differences 560 based on the device fingerprint 530 and the closest matching fingerprint 550. In many aspects, the attribute differences 560 are determined based on differences in the device attributes associated with computing device 514 indicated in device fingerprint 530 and device attributes associated with computing device 514' indicated in the closest matching fingerprint 550. The processor 520 can verify the closest matching fingerprint 550 identifies the computing device 514 (that is, computing device 514' and computing device 514 are the same computing device) based on the attribute differences 560. In several aspects, the processor 520 can update the closest matching fingerprint 550 in a fingerprint database 570 as described herein.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, aspects of the present disclosure should be considered in all respects as illustrative and not restrictive. It will be evident to the annotator skilled in the art to freely combine several or all of the aspects discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A computer-implemented method, comprising:
   obtaining device attribute data for a computing device, wherein the device attribute data comprises a first set of device attributes associated with the computing device;
   generating a device fingerprint comprising a piecewise hash generated based on the device attribute data;
   determining a closest matching fingerprint to the device fingerprint by:
      identifying a plurality of candidate fingerprints;
      determining similarities between the device fingerprint and the plurality of candidate fingerprints; and
      selecting a candidate fingerprint, from among the plurality of candidate fingerprints, that is most similar to the device fingerprint as the closest matching fingerprint;
   after determining the closest matching fingerprint, determining attribute differences between the first set of device attributes represented by the device fingerprint and a second set of device attributes represented by the closest matching fingerprint;
   after determining the attribute differences, verifying whether the closest matching fingerprint identifies the computing device, wherein the verification is performed based on the attribute differences;
   transmitting a notification generated based on the verifying.

2. The computer-implemented method of claim 1, further comprising:
   detecting a change in hardware of the computing device based on the attribute differences, wherein the notification indicates the change in the hardware of the computing device.

3. The computer-implemented method of claim 1, further comprising:
   detecting a change in software of the computing device based on the attribute differences, wherein the notification indicates the change in the software of the computing device.

4. The computer-implemented method of claim 1, wherein the first set of device attributes comprise at least one software attribute and a plurality of hardware attributes.

5. The computer-implemented method of claim 4, wherein the at least one software attribute is selected from the group consisting of: an operating system version, at least one installed software identifier, an internet protocol address, a machine name, a user identifier, and a fully qualified domain name.

6. The computer-implemented method of claim 4, wherein the plurality of hardware attributes is selected from the group consisting of: a bios universally unique identifier and at least one hardware media access control address.

7. The computer-implemented method of claim 1, wherein the device attribute data comprises a virtual machine identifier and a virtual machine host identifier.

8. The method of claim 1, wherein the verifying involves:
   determining a number of attribute differences between the first set of device attributes and the second set of device attributes;
   calculating a score based on the number of attribute differences; and
   comparing the score to a threshold value.

9. An apparatus, comprising:
   a processor; and
   a memory in communication with the processor and storing instructions that, when executed by the processor, cause the apparatus to:
      obtain device attribute data for a computing device, wherein the device attribute data indicates a first set of device attributes;
      generate a device fingerprint based on the device attribute data;
      determine a closest matching fingerprint by:
         identifying a plurality of candidate fingerprints based on the device fingerprint;
         determining similarities between the device fingerprint and the plurality of candidate fingerprints; and
         selecting a candidate fingerprint, from among the plurality of candidate fingerprints, that is most similar to the device fingerprint as the closest matching fingerprint;
      after determining the closest matching fingerprint, determine attribute differences between the first set of device attributes represented by the device fingerprint and a second set of device attributes represented by the closest matching fingerprint;
      after determining the attribute differences, verify whether the closest matching fingerprint identifies the computing device, wherein the verification is performed based on the attribute differences; and
      update the closest matching fingerprint in a fingerprint database based on the device fingerprint.

10. The apparatus of claim 9, wherein the instructions, when executed by the processor, further cause the apparatus to:
    detect a change in hardware of the computing device based on the attribute differences; and
    transmit a notification indicating the change in the hardware of the computing device.

11. The apparatus of claim 9, wherein the instructions, when executed by the processor, further cause the apparatus to:
- detect a change in software installed on the computing device based on the attribute differences; and
- transmit a notification indicating the change in the software installed on the computing device.

12. The apparatus of claim 9, wherein the first set of device attributes comprise at least one software attribute and a plurality of hardware attributes.

13. The apparatus of claim 12, wherein the at least one software attribute is selected from the group consisting of an operating system version, at least one installed software identifier, an internet protocol address, a machine name, a user identifier, and a fully qualified domain name.

14. The apparatus of claim 9, wherein the device attribute data comprises a virtual machine identifier and a virtual machine host identifier.

15. A non-transitory computer readable medium storing instructions that, when executed by one or more processors, cause the one or more processors to perform steps comprising:
- obtaining device attribute data for a computing device, wherein the device attribute data indicates a first set of device attributes;
- generating a device fingerprint comprising a piecewise hash generated based on the device attribute data;
- determining a closest matching fingerprint to the device fingerprint by:
  - identifying a plurality of candidate fingerprints;
  - determining similarities between the device fingerprint and the plurality of candidate fingerprints; and
  - selecting a candidate fingerprint, from among the plurality of candidate fingerprints, that is most similar to the device fingerprint as the closest matching fingerprint;
- after determining the closest matching fingerprint, determining attribute differences between the first set of device attributes represented by the device fingerprint and a second set of device attributes represented by the closest matching fingerprint;
- after determining the attribute differences, verifying whether the closest matching fingerprint identifies the computing device, wherein the verification is performed based on the attribute differences; and
- transmitting a notification generated based on the verifying.

16. The non-transitory computer readable medium of claim 15, wherein the instructions, when executed by the one or more processors, further cause the one or more processors to:
- detect a change in hardware of the computing device based on the attribute differences, wherein the notification indicates the change in the hardware of the computing device.

17. The non-transitory computer readable medium of claim 15, wherein the instructions, when executed by the one or more processors, further cause the one or more processors to:
- detect a change in software of the computing device based on the attribute differences, wherein the notification indicates the change in the software of the computing device.

18. The non-transitory computer readable medium of claim 15, wherein the first set of device attributes includes at least one software attribute that is selected from the group consisting of: an operating system version, at least one installed software identifier, an internet protocol address, a machine name, a user identifier, and a fully qualified domain name.

19. The non-transitory computer readable medium of claim 15, wherein the first set of device attributes includes a plurality of hardware attributes that is selected from the group consisting of: a bios universally unique identifier, at least one hardware media access control address, a memory capacity, and a total storage capacity.

20. The non-transitory computer readable medium of claim 15, wherein the device attribute data comprises a virtual machine identifier and a virtual machine host identifier.

* * * * *